(12) United States Patent
Penner et al.

(10) Patent No.: US 9,068,334 B2
(45) Date of Patent: *Jun. 30, 2015

(54) APPARATUS FOR DISPOSAL FROM A RECREATIONAL VEHICLE

(71) Applicants: Erich Penner, Courtenay (CA); Kurt Richard Penner, Courtenay (CA)

(72) Inventors: Erich Penner, Courtenay (CA); Kurt Richard Penner, Courtenay (CA)

(\*) Notice: Subject to any disclaimer, the term of this patent is extended or adjusted under 35 U.S.C. 154(b) by 0 days.

This patent is subject to a terminal disclaimer.

(21) Appl. No.: 14/197,669

(22) Filed: Mar. 5, 2014

(65) Prior Publication Data

US 2014/0182712 A1     Jul. 3, 2014

Related U.S. Application Data

(63) Continuation-in-part of application No. 13/333,898, filed on Dec. 21, 2011, now Pat. No. 8,701,700.

(60) Provisional application No. 61/426,393, filed on Dec. 22, 2010.

(51) Int. Cl.
*E03F 1/00* (2006.01)
*B60R 15/00* (2006.01)

(52) U.S. Cl.
CPC *E03F 1/008* (2013.01); *B60R 15/00* (2013.01)

(58) Field of Classification Search
CPC ............ E03F 1/00; E03F 1/008; B60R 15/00; F16L 3/015; F16K 1/46
USPC .............. 137/355.12, 355.16, 355.2, 355.24, 137/615, 899, 351; 59/78
See application file for complete search history.

(56) References Cited

U.S. PATENT DOCUMENTS

| | | | |
|---|---|---|---|
| 3,228,421 A | | 1/1966 | Sheiry |
| 4,036,257 A | * | 7/1977 | Hanson et al. ............ 137/614.06 |
| 4,066,093 A | * | 1/1978 | Egerstrom .................. 137/355.2 |
| 5,108,350 A | * | 4/1992 | Szpakowski .................. 474/207 |
| 5,505,237 A | * | 4/1996 | Magne .......................... 141/388 |
| 5,640,996 A | | 6/1997 | Schlecht et al. |
| 5,970,701 A | | 10/1999 | Roden et al. |
| 6,543,484 B1 | * | 4/2003 | Highsmith .................... 137/899 |
| 6,802,343 B2 | | 10/2004 | Faahs |
| 8,701,700 B2 | * | 4/2014 | Penner et al. ................. 137/351 |

\* cited by examiner

*Primary Examiner* — Craig Schneider
*Assistant Examiner* — Michael R Reid
(74) *Attorney, Agent, or Firm* — Schwabe, Williamson & Wyatt (57) ABSTRACT

An apparatus for emptying a storage tank of a vehicle into a collection unit, the apparatus including: a conduit assembly including a conduit received in a channel of a self-supporting chain, the conduit assembly unwindable from a reel located in a recess of the vehicle to move an outlet of the conduit into communication with an inlet of the collection unit prior to opening the valve of the storage tank.

15 Claims, 13 Drawing Sheets

FIG. 14 under the title "APPARATUS FOR DISPOSAL FROM A RECREATIONAL VEHICLE".

APPARATUS FOR DISPOSAL FROM A RECREATIONAL VEHICLE

CROSS REFERENCE TO RELATED APPLICATION

The present application is a continuation-in-part of U.S. patent application Ser. No. 13/333,898, filed Dec. 21, 2011 for "APPARATUS FOR SEWAGE DISPOSAL FROM A RECREATIONAL VEHICLE," which claims priority to U.S. Provisional Patent Application No. 61/426,393, filed Dec. 22, 2010, the entire disclosures of which are hereby incorporated by reference.

TECHNICAL FIELD

The present disclosure relates to methods and apparatus for emptying sewage or other storage tanks of recreational vehicles and other mobile units having sewage or other storage tanks.

BACKGROUND

Many recreational vehicles, such as mobile homes, include toilets having on-board sewage storage. In order to drain sewage from sewage storage tanks of the prior art, an operator performs a series of steps. First, the operator removes a sewage hose from its storage position and manually attaches one end of the sewage hose to a drain valve of the recreational vehicle. The sewage hose is then manually extended toward the sewage disposal unit at the park or campsite, for example, and the sewage hose is manually coupled to the inlet of the sewage disposal unit. The operator then opens the valve of the recreational vehicle tank in order for the sewage to drain into the sewage disposal unit inlet. Once all of the sewage has drained, the operator removes the dirty sewage hose from the sewage disposal unit inlet, removes the hose from the recreational vehicle drain valve and closes the drain valve. The operator then manually returns the sewage hose to its storage position.

These steps are quite onerous and often result in the operator coming into contact with the sewage.

SUMMARY

In an aspect there is provided an apparatus for emptying a storage tank of a vehicle, the apparatus comprising: a reel coupled to a base, the base received in a recess of a vehicle; and a self-supporting chain mounted on the reel, the self-supporting chain comprising a channel receiving a fluid-receiving conduit, a first end of the self-supporting chain coupled to the chain reel and the self-supporting chain being unwindable from the chain reel to move a second end of the self-supporting chain from a retracted position to an extended position, the self-supporting chain being maintained in a generally linear position when in the extended position, the self-supporting chain for moving an outlet of the fluid-receiving conduit into communication with an inlet of a collection unit prior to opening a valve of the storage tank; wherein the apparatus is sized to be received in a recess of the vehicle when the self-supporting chain is in the retracted position.

In another aspect there is provided a conduit assembly for emptying a storage tank of a vehicle, comprising: a self-supporting chain comprising inner and outer links coupled to one another and conduit supporting structures extending from ones of the inner and outer links; and a conduit received in a channel of the self-supporting chain, the channel delimited by the inner and outer links and the conduit supporting structures, the conduit in fluid communication with the storage tank for emptying contents of the tank into a collection unit; wherein the self-supporting chain is wound around a reel receivable in the vehicle and is unwindable to an extended position in which the self-supporting chain is generally linear.

DRAWINGS

The following figures set forth embodiments in which like reference numerals denote like parts. Embodiments are illustrated by way of example and not by way of limitation in the accompanying figures.

DETAILED DESCRIPTION

Figure 1:
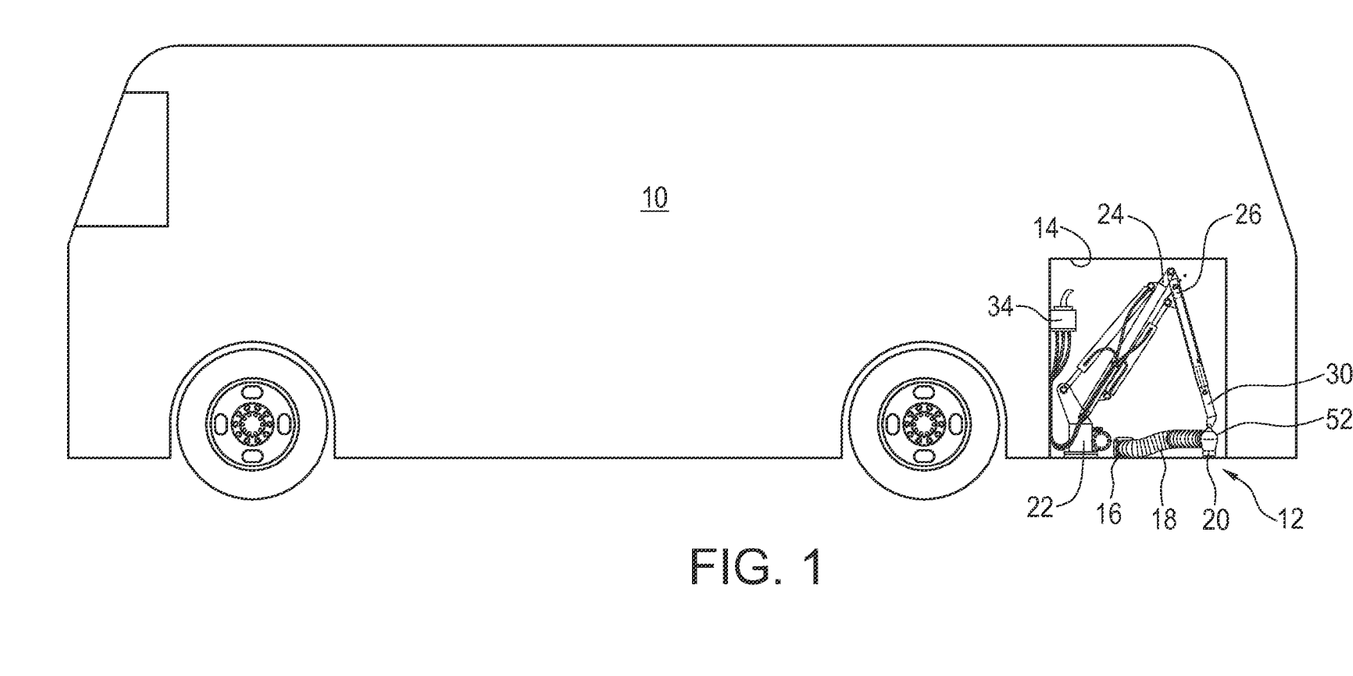
FIG. 1 is a side view of an example recreational vehicle including an apparatus for emptying sewage according to an embodiment.
Figure 2:
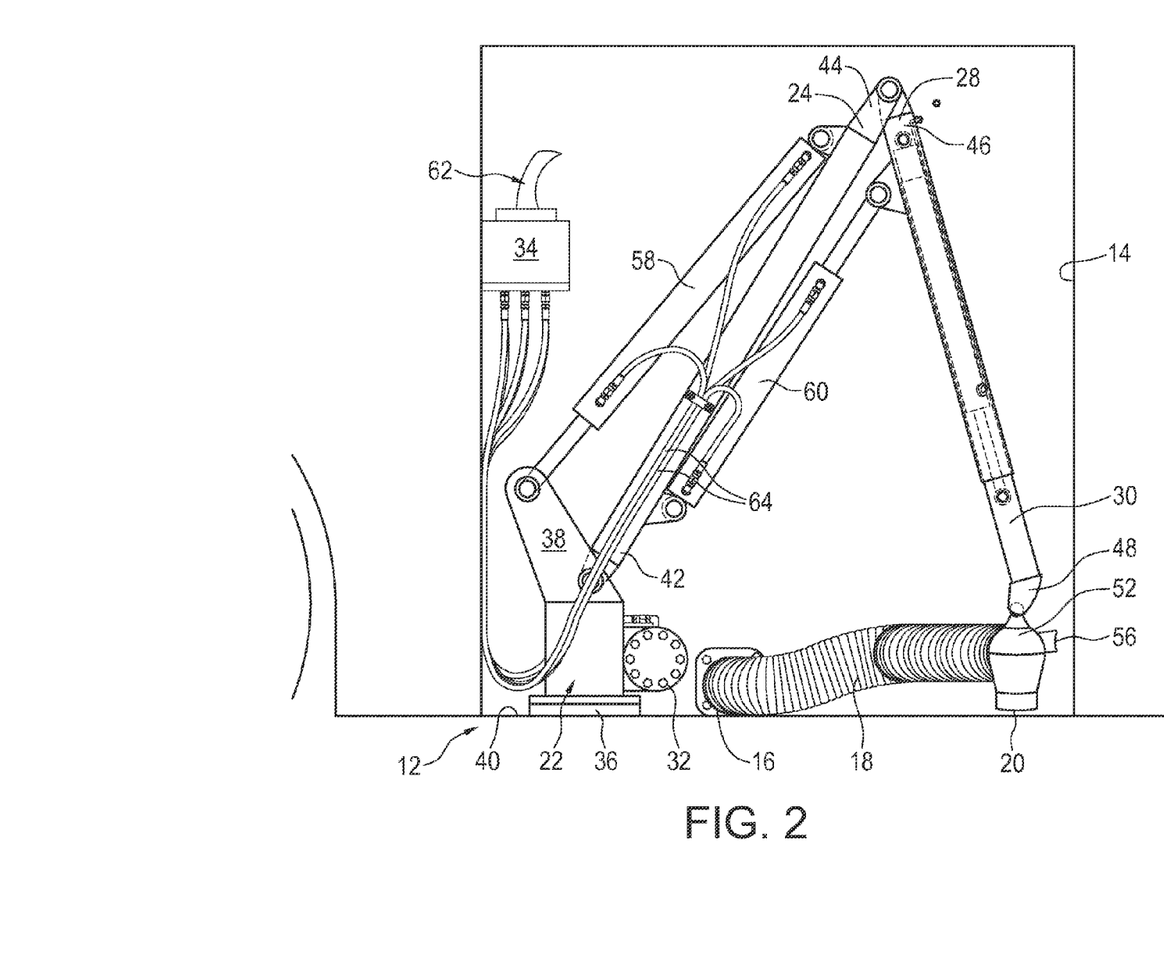
FIG. 2 is an enlarged view of a portion of FIG. 1.

Referring to FIGS. 1 and 2, an apparatus 12 for moving a sewage conduit of a vehicle toward a sewage disposal unit (not shown) is coupled to a recreational vehicle 10, which is shown by way of example. The apparatus 12 may be installed on any vehicle having an on-board sewage storage tank including: recreational vehicles, trailers or boats, for example. The apparatus 12 may also be used for emptying other fluids from onboard storage tanks of vehicles including: grey water, hazardous liquid material or clean drinking water, for example.

The apparatus 12 is located in a recess 14 that is provided near a sewage storage tank (not shown) of the vehicle 10. The recess 14 is sized to include an outlet 16 of the sewage storage tank, the apparatus 12 and a sewage conduit 18, which is coupled to the outlet 16. A cover (not shown) is removable to allow the operator to access the recess 14. The cover may be a hinged door that is openable to allow the operator to access the recess 14.

The sewage conduit 18 is generally a hose that is coupled to the outlet 16 of the sewage storage tank. The sewage conduit 18 is collapsible and is stored within the recess 14 when not in use. In the embodiment of FIGS. 1 and 2, the sewage conduit 18 is a collapsible corrugated pipe having an outlet 20. The sewage conduit may alternatively be a telescopic pipe or another retractable or collapsible pipe, for example.

Figure 3:
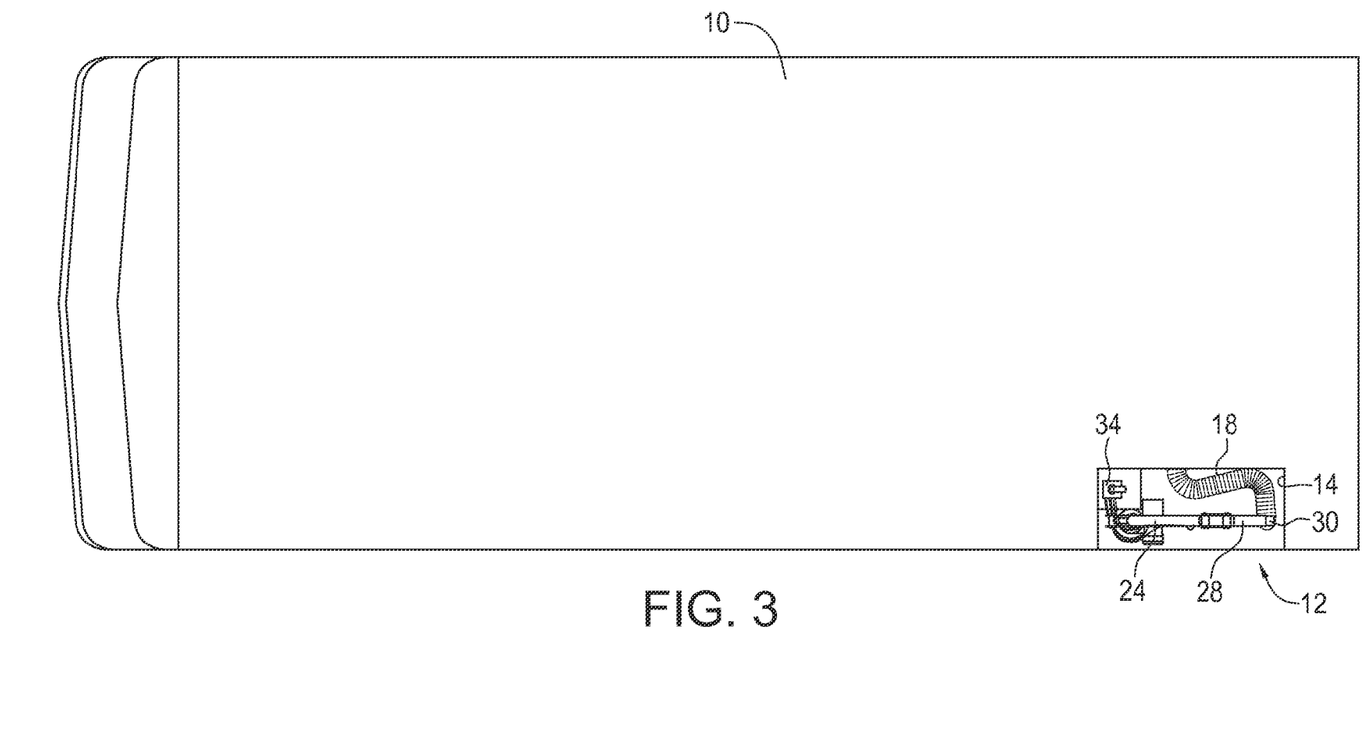
FIG. 3 is a top view of the example recreational vehicle of FIG. 1.
Figure 4:
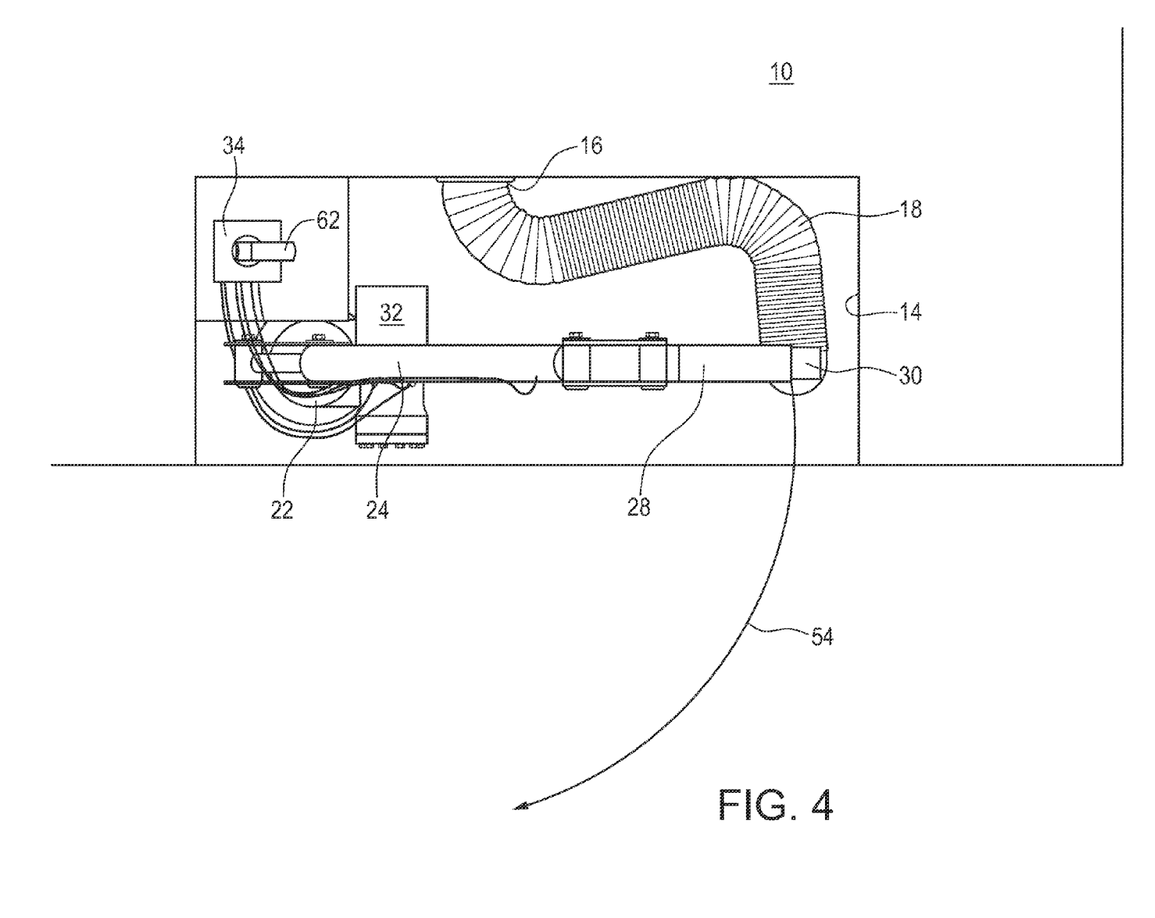
FIG. 4 is an enlarged view of a portion of FIG. 3.

Referring also to FIGS. 3 and 4, the apparatus 12 includes a base 22, a link arm 24 and an upper arm assembly 26, which includes an upper arm 28 and an extendible arm 30. The apparatus 12 further includes a motor driven hydraulic pump and valve assembly 32 and a control panel 34 for controlling movement of the link arm 24 and upper arm assembly 26.

The base 22 includes a fixed portion 36 and a rotatable portion 38. The fixed portion 36 is coupled to a lower surface 40 of the recess 14 and the rotatable portion 38 rotates relative thereto.

A first end 42 of the link arm 24 is hinged to the base 22 and a first end 46 of the upper arm 28 is hinged to a second end 44 of the link arm 24. The extendible arm 30 of the upper arm assembly 26 is movable relative to the upper arm 28 along an axis of the upper arm 28. Movement of the extendible arm 30 may be powered by hydraulics (water or oil), electric motor or movement of the extendible arm may be manually achieved using a cable system, for example. In one embodiment, the movement of the extendible arm 30 may be achieved manually by including a handle (not shown) on the extendible arm 30 so that the operator may manually move the sewage conduit 18.

A second end 48 of the extendible arm 30 includes a clamp 52 that is continuously coupled to the outlet 20 of the sewage conduit 18. The clamp 52 is generally an elbow-shaped fitting that redirects sewage exiting the sewage conduit 18 into the sewage disposal unit. Although the sewage conduit 18 is continuously coupled to the outlet of the sewage storage tank at one end and the clamp 52 at the opposite end, it will be appreciated by a person skilled in the art that the sewage conduit may be de-coupled to allow for cleaning, replacement or repair, for example.

The apparatus 12 is rotatable to swing the link arm 24 and upper arm assembly 26 in the direction indicated by arrow 54 of FIG. 4. The maximum range of rotation of the rotatable portion 38 is at least 180 degrees, however, the range may be reduced based on how far the base 22 is located into the recess 14. When extended, the link arm 24 and the upper arm assembly 26 cover a distance of approximately 20 ft from the base 22. In other embodiments this distance may be increased or reduced by adjusting the length of one or more of the link arm 24, the upper arm 28 and the extendible arm 30.

A first sensor 56 is coupled to the second end 48 of the extendible arm 30. The first sensor 56 is for communicating with a second sensor (not shown). The second sensor is stored in the vehicle 10 and is movable by the operator to a location adjacent the inlet of the sewage disposal unit. In general, the first sensor 56 is a receiver and a transmitter and the second sensor is at least a transmitter. The first sensor 56 receives location information from the second sensor and sends its own location information and the location information of the second sensor to the control panel 34, which controls movement of the apparatus 12. In one embodiment, both sensors send their respective location information to the control panel 34. In another embodiment, both sensors are provided with both receiving and transmitting capabilities.

The control panel 34 is generally a computer that is in communication with the motor driven hydraulic pump and valve assembly 32, which forces fluid through hydraulic lines 64 that actuate first and second hydraulic cylinders, 58 and 60. The hydraulic cylinders 58 and 60 are coupled between the base 22 and the link arm 24 and the link arm 24 and the upper arm 28, respectively. The control panel 34 further controls opening and closing of the valve (not shown) at the outlet of the sewage control tank. Alternatively, opening and closing of the valve may be performed manually.

Movement of the apparatus 12 may be controlled automatically based on feedback from the first sensor 56 and second sensor or may be controlled manually by using a joystick 62, which is coupled to the control panel 34.

Figure 5:
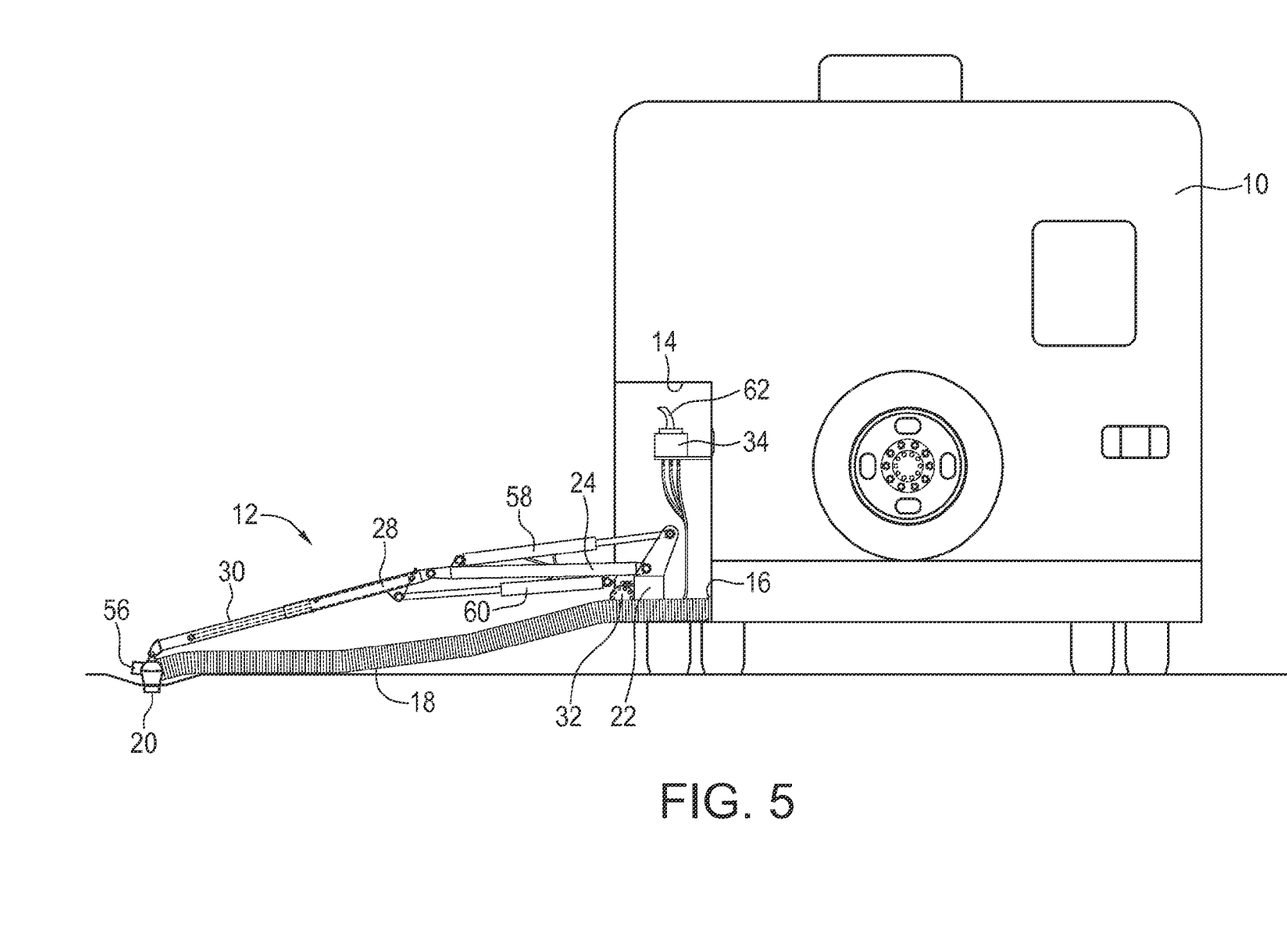
FIG. 5 is a rear view of the example recreational vehicle of FIG. 1.
Figure 6:
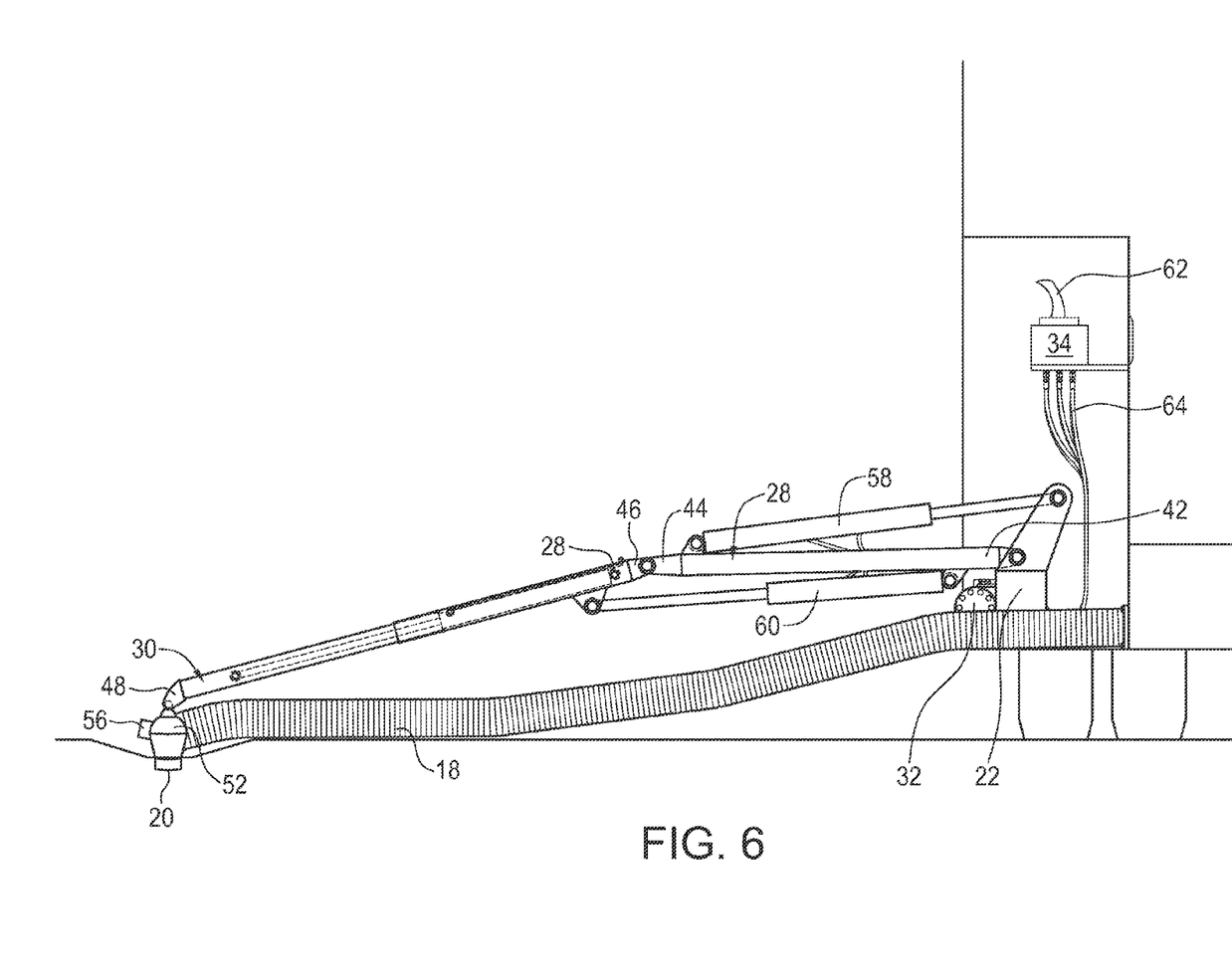
FIG. 6 is an enlarged view of a portion of FIG. 5.

In operation, in order to empty the on-board sewage storage tank, the operator parks the vehicle 10 near a sewage disposal unit at a campsite or recreational vehicle park, for example, and removes the cover to expose the sewage conduit 18 and the apparatus 12. Using the control panel 34, the operator then initiates movement of the apparatus 12 to move the outlet 20 of the sewage conduit 18 into communication with the sewage disposal unit, as shown in FIGS. 5 and 6. Once the outlet 20 is positioned so that sewage exiting the sewage conduit 18 will be deposited into the sewage disposal unit, the operator then opens the valve at the outlet of the sewage storage tank to allow sewage to empty from the on-board sewage storage tank. Once sewage disposal is complete, the operator operates the control panel 34 to close the valve and retract the apparatus 12 into the recess 14.

In another embodiment, the base 22, link arm 24 and upper arm assembly 26 are manually operable to move the outlet 20 of the sewage conduit 18 into communication with the sewage disposal unit. In this embodiment, the motor, control panel and hydraulic cylinders are omitted and a handle is coupled to the extendible arm 30 adjacent the second end 48. In operation, the operator would manually locate the outlet 20 of the sewage conduit 18 using the handle and manually open the valve at the outlet of the sewage storage tank using a lever or other externally accessible valve-opening mechanism. Once sewage disposal has completed, the operator would manually close the valve and stow the sewage conduit and apparatus.

In yet another embodiment, rather than being hydraulically powered, the apparatus 12 is electro-mechanically powered. In this embodiment, the hydraulic cylinders are replaced by electric servo motors.

In another embodiment, a video camera is provided in communication with the control panel 34. In this embodiment, the video camera is mounted to the recreational vehicle 10 and is able to view the inlet of the sewage disposal unit. An object may be placed beside the inlet of the sewage disposal unit and the camera provided with software having object recognition capability, which identifies the object and provides location information to the control panel 34. The control panel 34 would then direct the apparatus 12 to the inlet of the sewage disposal unit. The video camera may be used with hydraulic powered apparatus 12 or an electro-mechanically powered apparatus 12.

In still another embodiment, the software of the video camera is capable of identifying at least one feature of the inlet of the sewage disposal unit and providing location information to the control panel 34.

Figures 7, 8:
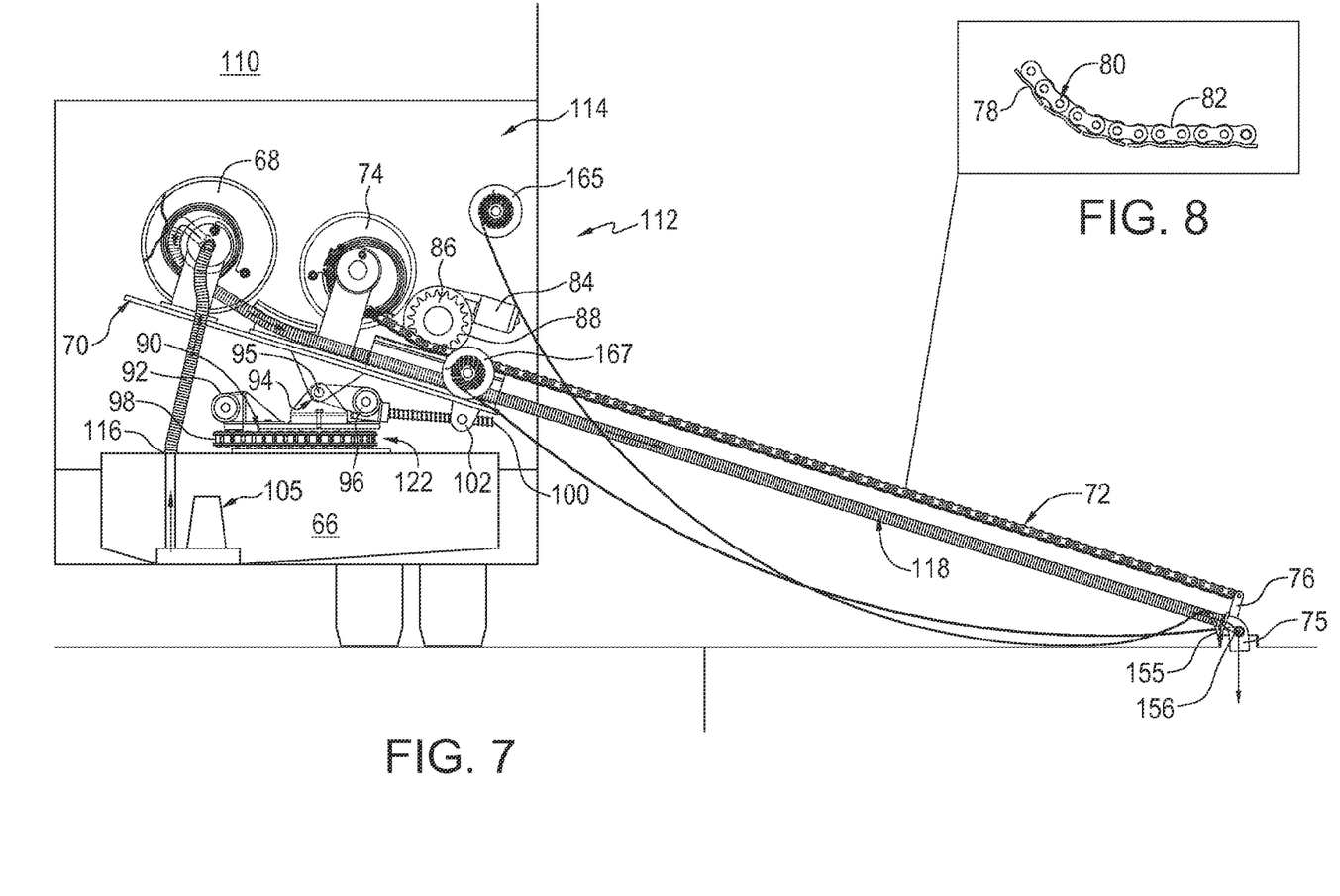
FIG. 7 is a rear view of another example recreational vehicle including an apparatus for emptying sewage according another embodiment in which the apparatus in an extended position.
FIG. 8 is an enlarged view of a self-supporting chain of the apparatus for emptying sewage of FIG. 7.

Referring now to FIG. 7, according to another embodiment, an apparatus 112 for moving a sewage conduit 118 toward a sewage disposal unit (not shown) is coupled to a recreational vehicle 110. Similar to the apparatus 12 of FIGS. 1 to 6, the apparatus 112 may be installed on any vehicle having an on-board sewage storage tank including: recreational vehicles, trailers or boats, for example.

The apparatus 112 is located in a recess 114 of the vehicle 110, near a sewage storage tank 66. The recess 114 is sized to include an outlet 116 of the sewage storage tank 66, the apparatus 112 and the sewage conduit 118. A cover (not shown) is removable to allow the operator to access the recess 114. The cover may be a hinged door that is openable to allow the operator to access the recess 114. In the recreational vehicle 110 of FIG. 7, the recess 114 is located on the back of the recreational vehicle 110, however, the recess 114 may alternatively be located on a side or other location near the sewage storage tank 66.

Figure 9:
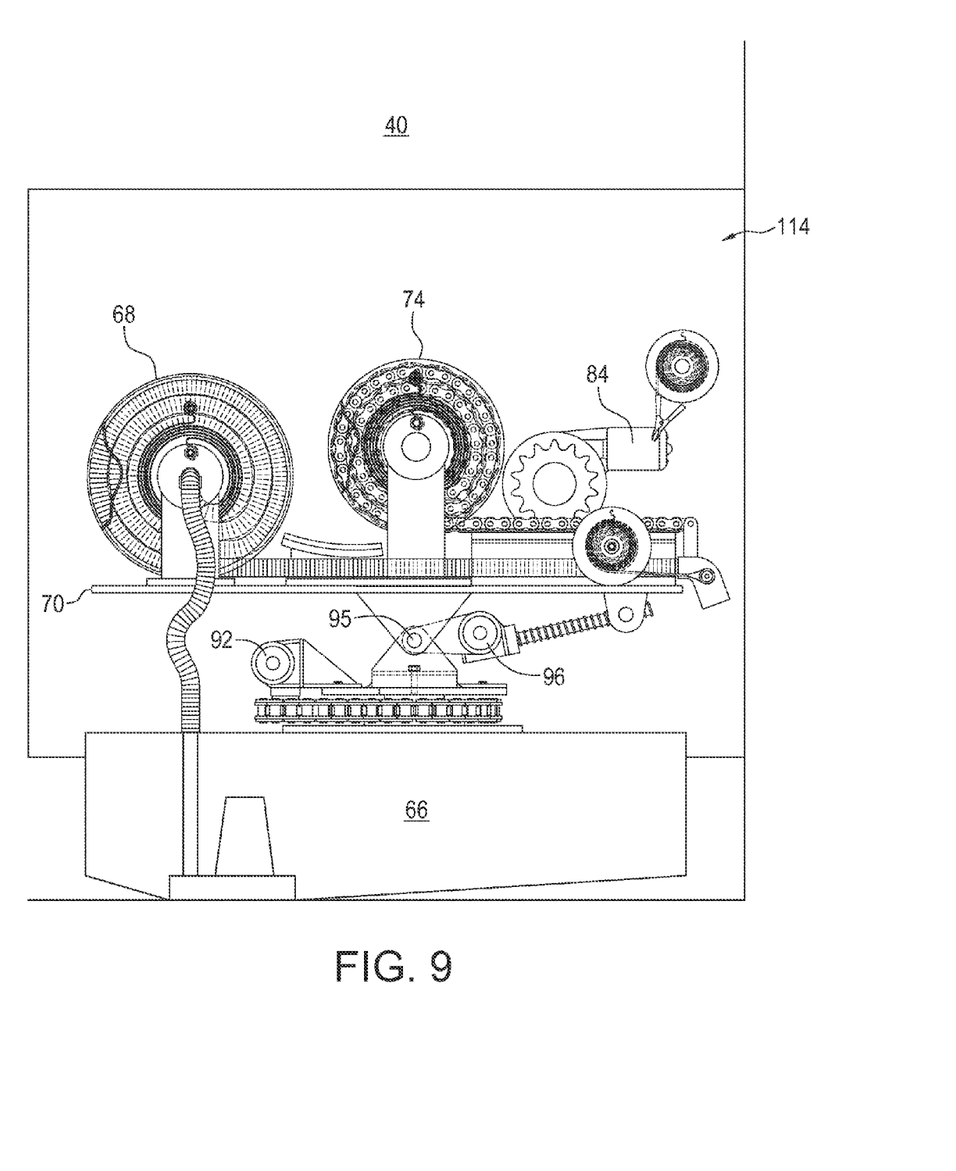
FIG. 9 is a rear view of the example recreational vehicle of FIG. 7 in which the apparatus for emptying sewage is in a retracted position.

The sewage conduit 118 is generally a hose that is coupled, at a first end, to the outlet 116 of the sewage storage tank 66. The sewage conduit 118 is wound around a sewage conduit reel 68 that is mounted on a platform 70 and is rotatable to extend and retract the sewage conduit 118. The sewage conduit 118 is stored in a retracted position, as shown in FIG. 9, when not in use, and movable toward an extended position, which is shown in FIG. 7, for sewage disposal. A second end of the sewage conduit 118 is coupled to a pipe elbow 75, which is inserted into an inlet of a sewage disposal unit during sewage disposal.

The sewage conduit 118 is movable between the retracted position and the extended position by a self-supporting chain 72. The self-supporting chain 72 is wound around a chain reel 74 when retracted and is movable between the retracted and extended positions by a chain motor 84. The motor 84 includes a rotatable gear 86 having teeth 88 for engaging the self-supporting chain 72. The chain reel 74 is mounted on the platform 70 adjacent to the sewage conduit reel 68. A clamp 76 is located at a second end of the self-supporting chain 72 to couple the self-supporting chain 72 to the pipe elbow 72. Because the second end of the self-supporting chain 72 is coupled to the second end of the sewage conduit 118, the sewage conduit 118 extends when the self-supporting chain 72 extends. Similarly, the sewage conduit 118 retracts when the self-supporting chain 72 retracts.

Referring also to FIG. 8, the self-supporting chain 72 includes a plurality of stops 78 that are coupled to a lower side of a roller chain 80 including a plurality of links 82. The roller chain 80 may be any industrial chain that is limited to bending in a single plane to wind and unwind the roller chain 80. In the example of FIG. 8, the stops 78 are plates that are located on an underside of the self-supporting chain 72 when the apparatus 112 is installed in the vehicle 110. The plates are coupled between adjacent ends of the links 82 and support the links 82 when the self-supporting chain 72 is extended in order to maintain the self-supporting chain 72 in a generally linear position. The plates restrict rotation of the roller chain 80 in one direction only, therefore, the self-supporting chain 72 may be wound around the chain reel 74 when the self-supporting chain 72 is in the retracted position.

It will be appreciated by a person skilled in the art that the stops 78 are not limited to being plates, the stops 78 may be any component capable of limiting movement of adjacent links 82 relative to one another. Further, one or both of the sewage conduit reel 68 and the chain reel 74 may be spring loaded to automatically retract the sewage conduit 118 and the self-supporting chain 72.

The apparatus 112 includes a base 122 that is rotatably coupled to the recreational vehicle 110. The base 122 includes a rotation unit 90 having a chain 98 that is movable by a worm gear and sprocket arrangement (not shown) that is driven by a first motor 92. A tilting unit 94 is coupled between the base 122 and a platform 70. A worm gear 100, which is driven by a second motor 96, engages a mating component 102 that extends from an underside 104 of the platform 70 to tilt the platform 70 about a tilting axis 95. It will be appreciated by a person skilled in the art that the base 122 and platform 70 may alternatively be hydraulically, electrically or manually driven.

Together, the base 122 and the platform 70 facilitate pivoting of the platform 70 relative to the vehicle 110. The amount that the base 122 is able to rotate relative to the vehicle 110 may be dependent on the location of the base 122 within the recess 114 as well as a starting position of the base 122. In one example, the base 122 is rotatable 180 degrees. The amount that the tilting unit 94 is able to tilt may be dependent on the location of the base 122 within the recess 114, the distance between the base 122 and the platform 70 and the length of the worm gear 100, for example. In one example, the tilting unit 94 is able to tilt the platform 70 45 degrees.

Referring back to FIG. 7, a first sensor 156 is coupled to the second end of the self-supporting chain 72. A second sensor 155 is for locating next to the sewage disposal unit during sewage disposal. The sensors operate in a similar manner as has been described with respect to the first and second sensors of the embodiment of FIGS. 1 to 6. The first sensor 156 and the second sensor 155 are coupled to sensor cables, which are wound on sensor cable spools 165, 167, respectively, when not in use. The sensor cable spools 165, 167 may be spring loaded to automatically retract the cables following use. In one embodiment, the sensor cables are eliminated and the sensors 156, 155 communicate wirelessly.

The apparatus 112 further includes a control panel (not shown), which is generally a computer that is in communication with the first motor 92, the second motor 96 and the chain motor 84. Movement of the apparatus 112 may be controlled automatically based on feedback from the first sensor 56 and second sensor 155 or may be controlled manually by using a joystick (not shown) or other input device in communication with control panel. The control panel operates in a similar manner as has been described in relation to the embodiment of FIGS. 1 to 6 and, therefore, will not be described further here.

In operation, in order to empty the on-board sewage storage tank 66, the operator parks the vehicle 110 near a sewage disposal unit at a campsite or recreational vehicle park, for example, and removes the cover to expose the apparatus 112. Using the control panel, the operator then initiates movement of the apparatus 112 to move an outlet of the pipe elbow 75 of the sewage conduit 118 into communication with the sewage disposal unit, as shown in FIG. 7. Movement of the apparatus 112 may include rotation by the rotation unit 90, tilting by the tilting unit 94, and extension of the self-supporting chain 72. Once the outlet is positioned so that sewage exiting the sewage conduit 118 will be deposited into the sewage disposal unit, the operator then opens the valve at the outlet of the sewage storage tank 66 and turns on a sewage pump 105 to pump sewage from the on-board sewage storage tank 66 through the sewage conduit 118. Once sewage disposal is complete, the operator operates the control panel to close the valve and stop the sewage pump and to retract the extendable arm into the recess 114.

It will be appreciated by a person skilled in the art that pivoting of the apparatus 112 and extension and retraction of the sewage conduit 118 and sensor cables may be performed manually.

The embodiment of FIGS. 7 and 9 is not limited to including a self-supporting chain 72. As will be appreciated by a person skilled in the art, the apparatus 112 may include other types of extendible members. Any extendible member capable of positioning the outlet of the pipe elbow 75 relative to a sewage disposal unit may be used, such as an extendible arm similar to the extendible arm 30 described in relation to FIGS. 1 to 6, for example.

Figure 10:
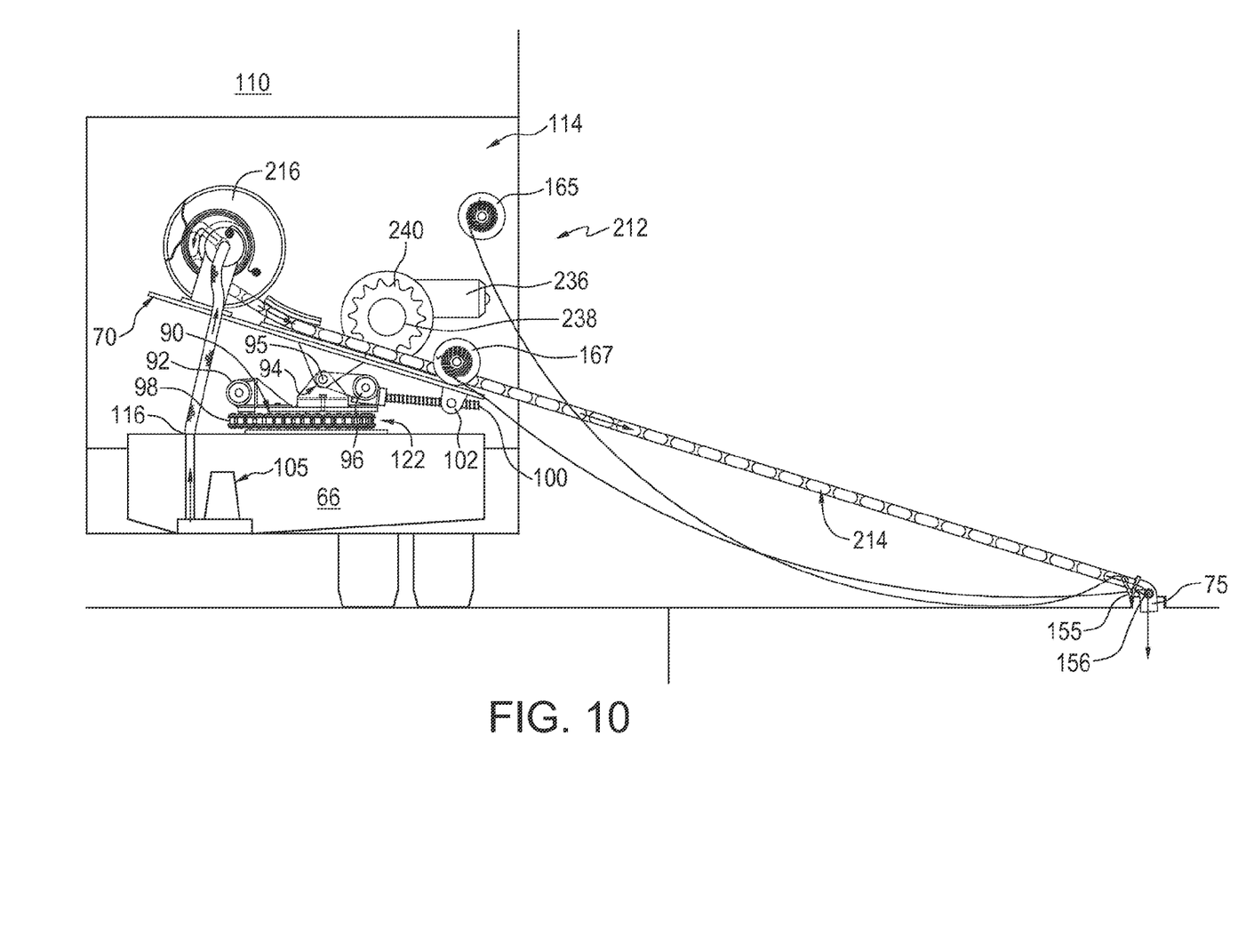
FIG. 10 is a rear view of yet another example recreational vehicle including an apparatus for emptying sewage according another embodiment in which the apparatus in an extended position.

Referring now to FIG. 10, according to yet another embodiment, an apparatus 212 for moving a conduit toward a collection unit (not shown) is coupled to a recreational vehicle 110. Similar to the apparatus 12 and 112 of FIGS. 1 to 9, the apparatus 212 may be installed on any vehicle having a tank for fluid storage including: recreational vehicles, trailers or boats, for example. The tank may contain sewage, grey water, hazardous liquid material or clean drinking water, for example. The apparatus 212 is used to facilitate emptying of the storage tank while avoiding operator contact with the storage tank contents.

Figure 11:
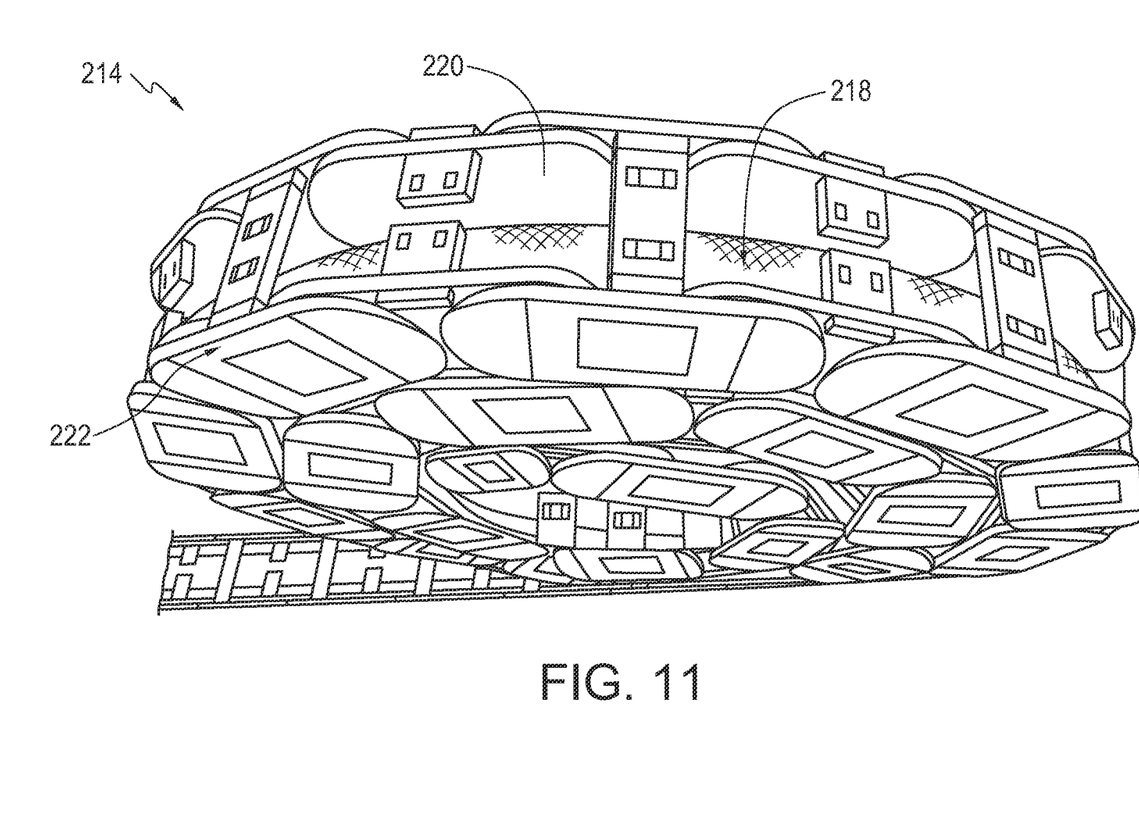
FIG. 11 is a top perspective view of a self-supporting chain assembly of FIG. 10 in a retracted position.
Figure 12:
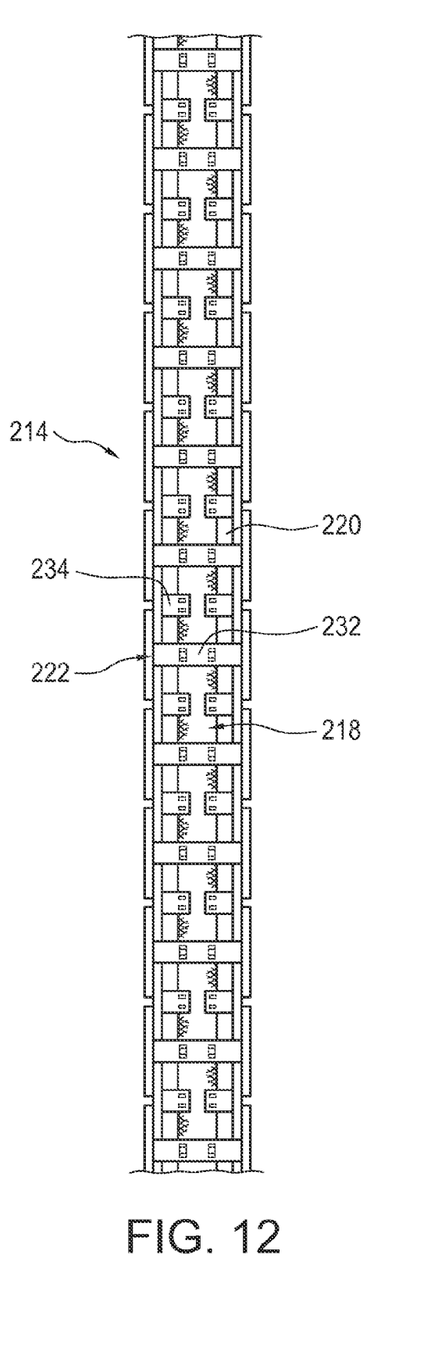
FIG. 12 is a top view of a portion of the self-supporting chain assembly of FIG. 10.

The apparatus 212 includes a conduit support assembly 214 that is wound around a reel 216. Referring also to FIG. 11, the conduit support assembly 214 includes a conduit 218 that is received in a channel 220 of a self-supporting chain 222 to facilitate extension and retraction of the conduit 218 and the self-supporting chain 222 as a unit. As shown in FIG. 11, the conduit support assembly 214 is stored in a retracted position when not in use. From the retracted position, the conduit support assembly 214 is movable toward an extended position for fluid transfer. The extended position is shown in FIGS. 10 and 12. Similar to the other embodiments described herein, a first end of the conduit 218 is coupled to the on-board storage tank 66 to receive fluid therefrom and a second end of the conduit support assembly 214 is coupled to the pipe elbow 75, which is inserted into an inlet of a collection unit during disposal. The collection unit may be a sewage disposal unit, a hazardous material collection unit or clean water collection unit, for example. The storage tank may also include solid material that flows out of the storage tank 66 along with liquids in the storage tank.

Figure 13:
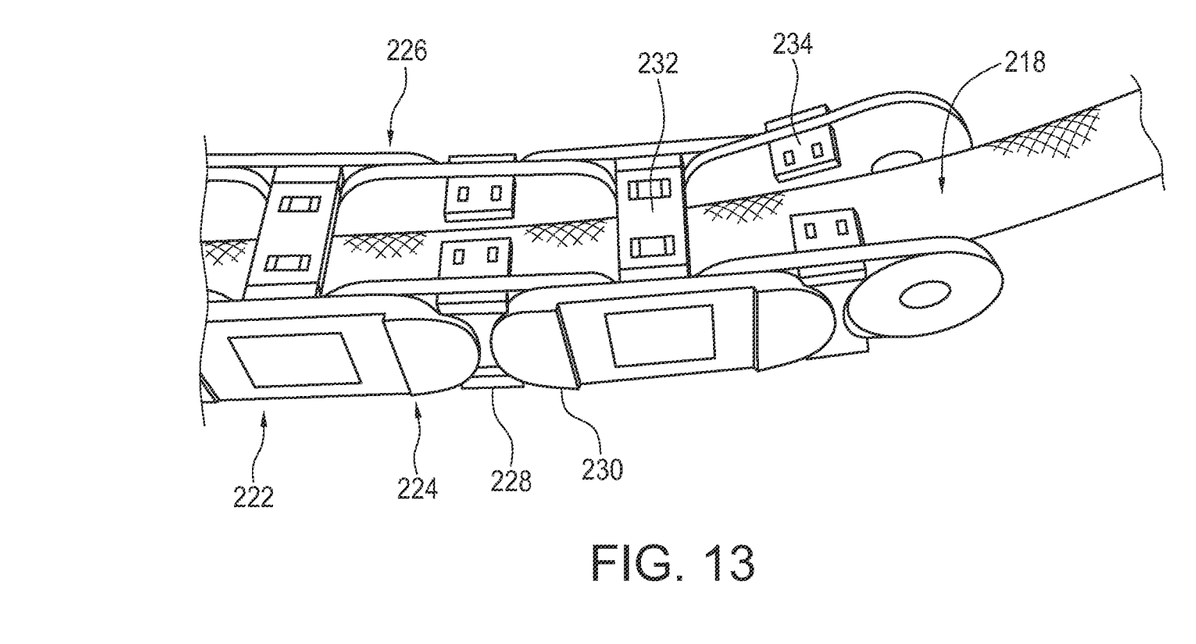
FIG. 13 is a side perspective view of the self-supporting chain assembly of FIG. 10.

In one example, the self-supporting chain 222 includes first and second chain members 224 and 226, respectively, which are spaced apart and coupled to one another by cross-members 232, which are shown in FIGS. 12 and 13. The chain members 224, 226 include a plurality of inner links 228 and outer links 230 that are coupled to one another, as shown in FIG. 13. The inner and outer links 228 and 230 of the chain members are shaped to facilitate winding of the self-supporting chain 222 in one direction and restrict unwinding beyond a generally linear position in the opposite direction to maintain the self-supporting chain 222 in a generally linear position. As will be understood by a person skilled in the art, stops that restrict unwinding of the self-supporting chain 222 beyond generally linear may be located on an underside of the self-supporting chain 222, such as stops 78 of FIG. 8, for example, or may be located between connecting portions of the outer links 228 and 230. In one example, the self-supporting chain is manufactured by Igus® of Germany.

Referring still to FIGS. 11 to 13, the cross-members 232 are coupled to projections 234 that extend from upper and lower ends of opposing links 228, 230 of the chain members 224, 226 to form the channel 220 that receives the conduit 218. In the example shown, alternating projections 234 along the length of the chain members are joined by cross-members 232. In order for the conduit 218 to be maintained within the self-supporting chain of the conduit support assembly 214, the conduit 218 is coupled to the reel 216 and fed through the channel 220 of the self-supporting chain 220.

The chain members 224, 226 may be generally identical and oriented as shown in FIGS. 11 to 13. Alternatively, in another example, one of the chain members 224, 226 may be replaced by conduit supporting structures that extend from the links 228, 230 and move therewith but are not connected to one another.

Figure 14:
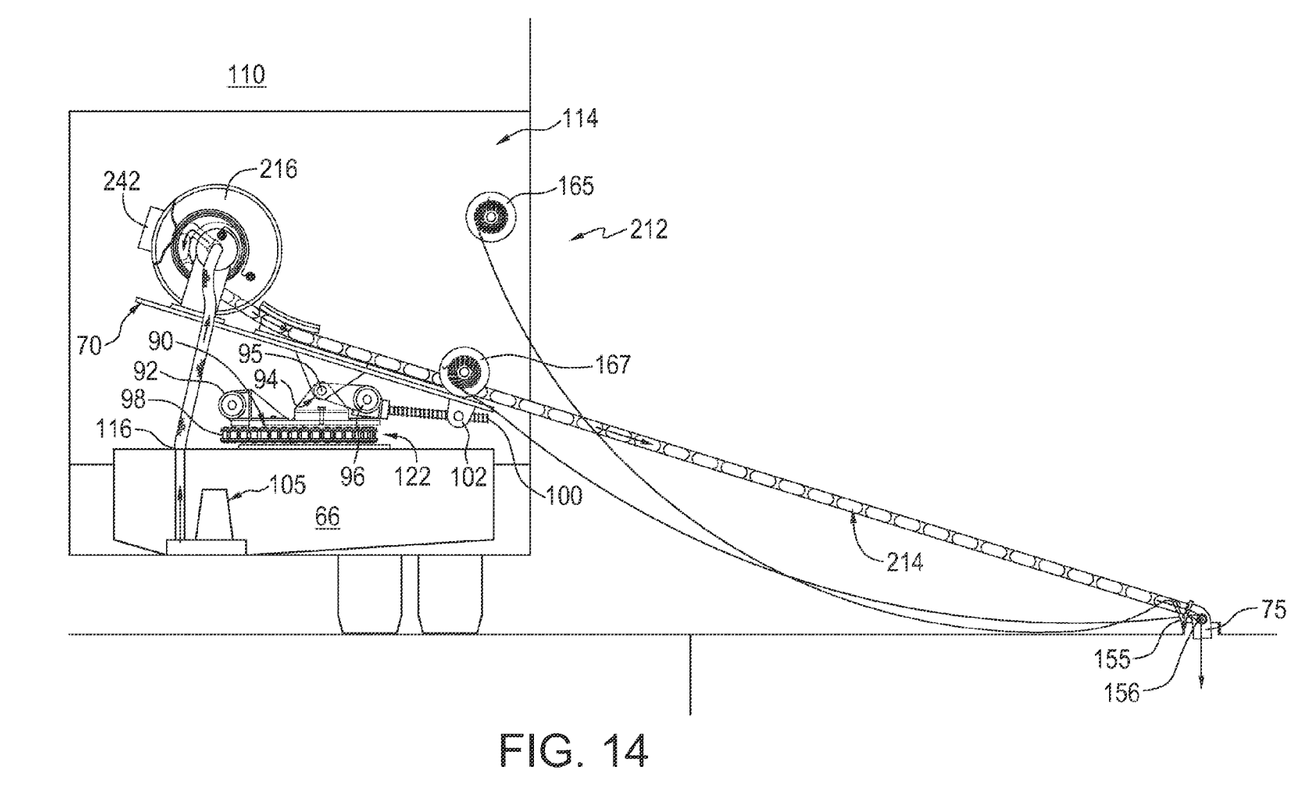
FIG. 14 is a rear view of still another example recreational vehicle including an apparatus for emptying sewage according another embodiment in which the apparatus in an extended position.

Referring back to FIG. 10, the conduit support assembly 214 is movable between the retracted position and the extended position by a chain motor 236. The motor 236 includes a rotatable gear 238 having teeth 240 for engaging the self-supporting chain 222. The conduit support assembly 214 may alternatively be movable between the retracted position and the extended position by a motor 242 that drives the reel 216, as shown in the embodiment of FIG. 14.

Similar to the embodiment of FIGS. 7 to 9, first and second sensors 155, 156 may be provided to allow for automatic location of the conduit outlet relative to the inlet of the collection unit. The apparatus 212 further includes a control panel (not shown), which is generally a computer that is in communication with the first motor 92 and the chain motor 284. Movement of the apparatus 212 may be controlled automatically based on feedback from the first sensor 156 and second sensor 155 or may be controlled manually by using a joystick (not shown) or other input device in communication with control panel. The control panel operates in a similar manner as has been described in relation to the embodiments of FIGS. 1 to 9 and, therefore, will not be described further here.

In operation, the operator may dispose of any fluid that is contained in an onboard storage tank. The following example relates to sewage disposal, however, as will be understood by a person skilled in the art, the apparatus 212 may alternatively transfer other fluids from a storage tank including grey water, hazardous liquid material or clean drinking water, for example. When disposing of grey water, a grey water valve is opened to allow the grey water to flow into the sewage conduit.

In order to empty sewage from the on-board storage tank 66, the operator parks the vehicle 110 near a sewage disposal unit at a campsite or recreational vehicle park, for example, and removes the cover to expose the apparatus 212. Using the control panel, the operator then initiates movement of the apparatus 212 to move an outlet of the pipe elbow 75 of the conduit 218 into communication with the sewage disposal unit, as shown in FIG. 10. Movement of the apparatus 212 may include rotation by the rotation unit 90, tilting by the tilting unit 94, and extension of the sewage conduit support assembly 214. Once the outlet is positioned so that sewage exiting the conduit 218 will be deposited into the sewage disposal unit, the operator then opens the valve at the outlet of the sewage storage tank 66 and turns on a sewage pump 105 to pump sewage from the on-board sewage storage tank 66 through the conduit 218. Once sewage disposal is complete, the operator operates the control panel to close the valve and stop the sewage pump and to retract the extendable arm into the recess 114.

An advantage of the embodiments described herein is that the operator does not contact the conduit so that the fluid transfer process is safe and sanitary and does not result in the operator coming into contact with sewage, grey water, hazardous liquids or clean drinking water.

A further advantage of the embodiments described herein is that the recess provides space so that the conduit may be continuously coupled to the outlet of the storage tank. Reconnection of the conduit to the outlet each time sewage is disposed of or fluid is transferred out of the vehicle is therefore avoided.

Specific embodiments have been shown and described herein. However, modifications and variations may occur to those skilled in the art. All such modifications and variations are believed to be within the scope and sphere of the present embodiments.

The invention claimed is:

1. An apparatus for emptying a storage tank of a vehicle, the apparatus comprising:
   a platform coupled to a base by a tilting unit, the base rotatably coupled to a surface within a recess of the vehicle;
   a reel coupled to and supported on the platform, the tilting unit operable to change an angle between the platform on which the reel is supported and the base to thereby change a distance between a center of the reel and a part of the vehicle on which the base is mounted, to facilitate angular pivoting of the reel relative to the vehicle; and
   a self-supporting chain mounted on the reel, the self-supporting chain comprising a channel receiving a fluid-receiving conduit, a first end of the self-supporting chain coupled to the reel and the self-supporting chain being unwindable from the reel to move a second end of the self-supporting chain from a retracted position to an extended position, the self-supporting chain being maintained in a generally linear position when in the extended position, the self-supporting chain for moving an outlet of the fluid-receiving conduit into communication with an inlet of a collection unit prior to opening a valve of the storage tank;
   wherein the apparatus is sized to be received in a recess of the vehicle when the self-supporting chain is in the retracted position.

2. The apparatus of claim 1, wherein movement of the self-supporting chain beyond a generally linear position when in the extended position is restricted.

3. The apparatus of claim 1, wherein movement of the self-supporting chain beyond a generally linear position when in the extended position is restricted by stops located between inner and outer links of the self-supporting chain.

4. The apparatus of claim 1, comprising a control panel in communication with a driving mechanism of the apparatus to control extension and pivoting of the self-supporting chain relative to the vehicle.

5. The apparatus of claim 4, wherein the driving mechanism comprises: a first motor for rotating the base relative to the vehicle, a second motor for tilting the platform relative to the base and a chain motor for rotating the reel.

6. The apparatus of claim 1, wherein the tilting unit is rotatably coupled to the base.

7. The apparatus of claim 1, wherein the base is rotatable by a motor.

8. The apparatus of claim 1, comprising a first sensor for coupling to an outlet of the fluid-receiving conduit and a second sensor for coupling to the inlet of the collection unit, the first sensor being in communication with the control panel.

9. The apparatus of claim 1, wherein the self-supported chain comprises first and second chain members spaced from one another and coupled to one another by cross-members.

10. The apparatus of claim 9, wherein the first and second chain members comprise inner and outer links.

11. The apparatus of claim 1, wherein self-supported chain comprises a chain member and conduit supporting structures extending from ones of inner and outer links of the chain member.

12. The apparatus of claim 1, comprising a video camera for identifying an object located near the inlet of the collection unit, the camera being in communication with the control panel.

13. The apparatus of claim 1, wherein the vehicle is at least one of: a recreational vehicle, a trailer and a boat.

14. The apparatus of claim 1, wherein the second end of the self-supporting chain is coupled to a pipe elbow, the pipe elbow being located at an end of the fluid-receiving conduit and sized for insertion into the inlet of the collection unit.

15. The apparatus of claim 1, wherein the collection unit is a sewage disposal unit.

* * * * *